US011914650B2

(12) United States Patent
Trim et al.

(10) Patent No.: US 11,914,650 B2
(45) Date of Patent: Feb. 27, 2024

(54) DATA AMALGAMATION MANAGEMENT BETWEEN MULTIPLE DIGITAL PERSONAL ASSISTANTS (71) Applicant: INTERNATIONAL BUSINESS MACHINES CORPORATION, Armonk, NY (US)

(72) Inventors: Craig M. Trim, Ventura, CA (US); Nadiya Kochura, Bolton, MA (US); Jeremy R. Fox, Georgetown, TX (US); Fang Lu, Billerica, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 420 days.

(21) Appl. No.: 16/935,380

(22) Filed: Jul. 22, 2020

(65) Prior Publication Data
US 2022/0027414 A1 Jan. 27, 2022

(51) Int. Cl.
*G06F 16/9032* (2019.01)
*G06F 9/46* (2006.01)
*G06F 9/54* (2006.01)
*G06F 16/9535* (2019.01)
*G06F 9/451* (2018.01)

(52) U.S. Cl.
CPC ........ *G06F 16/90332* (2019.01); *G06F 9/453* (2018.02); *G06F 9/465* (2013.01); *G06F 9/54* (2013.01); *G06F 16/9535* (2019.01)

(58) Field of Classification Search
CPC .... G06F 16/90332; G06F 9/453; G06F 9/465; G06F 9/54; G06F 16/9535
See application file for complete search history.

(56) References Cited

U.S. PATENT DOCUMENTS 5,899,972 A 5/1999 Miyazawa
8,738,739 B2 5/2014 Makar
(Continued)

OTHER PUBLICATIONS

Business Wire, "Global Intelligent Virtual Assistant Market 2018-2023: Market Value is Projected to Exceed US$ 9 Billion by 2023, Expanding at a CAGR of 32%—ResearchAndMarkets.com", Jul. 23, 2018, 3 pages.

(Continued)

*Primary Examiner* — Rami R Okasha
(74) *Attorney, Agent, or Firm* — Daniel G. DeLuca (57) ABSTRACT The present invention may have a computer that monitors conversation between a user and a first virtual assistant from a plurality of virtual assistants, for a confidence score value being below a confidence threshold value, where the confidence score value is associated with each answer of the first virtual assistant. When the computer determines the confidence score value is below the confidence threshold value, the computer generates a dialog flow for answering by a second virtual assistant, where the dialog flow is related to an answer associated with the confidence score value being below the confidence threshold value. Then, based on determining the second virtual assistant having a second confidence score value that is higher than the confidence score value, the computer transfers a knowledge base data of a topic associated with the dialog flow from the first virtual assistant to the second virtual assistant.

20 Claims, 5 Drawing Sheets

(56) References Cited

U.S. PATENT DOCUMENTS

| | | | |
|---|---|---|---|
| 9,575,964 B2 | 2/2017 | Yadgar | |
| 9,729,592 B2 | 8/2017 | Slayton | |
| 9,847,084 B2 | 12/2017 | Gustafson | |
| 9,973,457 B2* | 5/2018 | Cauchois | H04L 51/046 |
| 2003/0216919 A1 | 11/2003 | Roushar | |
| 2008/0091426 A1 | 4/2008 | Rempel | |
| 2008/0301135 A1 | 12/2008 | Alves | |
| 2011/0119196 A1* | 5/2011 | Ventura | G06Q 30/016 706/11 |
| 2014/0201629 A1* | 7/2014 | Heck | G06N 5/022 715/708 |
| 2014/0278435 A1 | 9/2014 | Ganong, III | |
| 2015/0066817 A1* | 3/2015 | Slayton | G06N 5/04 706/11 |
| 2016/0307117 A1* | 10/2016 | Yang | G06N 20/00 |
| 2017/0180284 A1 | 6/2017 | Smullen | |
| 2017/0242860 A1* | 8/2017 | Souche | G06F 16/24578 |
| 2017/0329466 A1* | 11/2017 | Krenkler | G06F 9/453 |
| 2018/0293484 A1* | 10/2018 | Wang | G06F 16/632 |
| 2018/0332169 A1* | 11/2018 | Somech | H04L 67/55 |
| 2018/0349508 A1* | 12/2018 | Bequet | G06F 18/217 |
| 2019/0042988 A1* | 2/2019 | Brown | G06N 5/022 |
| 2019/0213490 A1* | 7/2019 | White | G06Q 10/10 |
| 2019/0392325 A1* | 12/2019 | Lange | G06N 5/02 |
| 2020/0028803 A1* | 1/2020 | Helmy | H04M 3/5191 |
| 2020/0050942 A1* | 2/2020 | Sun | G06N 3/006 |
| 2020/0126540 A1* | 4/2020 | Panchamgam | H04L 51/046 |
| 2020/0341970 A1* | 10/2020 | Rodrigues | H04L 51/02 |
| 2020/0342850 A1* | 10/2020 | Vishnoi | H04L 51/214 |
| 2020/0374372 A1* | 11/2020 | Le Strat | H04L 67/567 |
| 2021/0406713 A1* | 12/2021 | Chauhan | G06N 20/00 |

OTHER PUBLICATIONS

McCormick, "Predictions 2017: Artificial Intelligence Will Drive The Insights Revolution Advanced Insights Will Spark Digital Transformation In The Year Ahead," Forrester, Nov. 2, 2016, 9 pages.

Mell, et al., "The NIST Definition of Cloud Computing", National Institute of Standards and Technology, Special Publication 800-145, Sep. 2011, 7 pages.

Zweig, et al., "Group online adaptive learning," Mach Learn (2017) 106:1747-1770, Received: Mar. 30, 2016 / Accepted: Jul. 6, 2017 / Published online: Aug. 1, 2017, copyright The Author(s) 2017, 24 pages.

* cited by examiner

DATA AMALGAMATION MANAGEMENT BETWEEN MULTIPLE DIGITAL PERSONAL ASSISTANTS

BACKGROUND

The present invention relates, generally, to the field of computing, and more particularly to data amalgamation management between multiple digital personal assistants.

A digital personal assistant, may also be referred to as a virtual assistant (VA), a chatbot, or as a personal assistant (PA) is a software agent that performs tasks or services for a user based on commands or questions in a natural language. Typically, virtual assistants are able to interpret human speech and respond either by text or via synthesized voices. In addition, digital personal assistants may be configured to allow users to ask questions, control automation devices and media using voice, and manage other basic tasks such as email, to-do lists, and calendars by executing verbal commands.

SUMMARY

According to one embodiment, a method, computer system, and computer program product for data amalgamation management is provided. The present invention may have a computer that monitors conversation between a user and a first virtual assistant from a plurality of virtual assistants, for a confidence score value being below a confidence threshold value, where the confidence score value is associated with each answer of the first virtual assistant. When the computer determines the confidence score value is below the confidence threshold value, the computer generates a dialog flow for answering by a second virtual assistant, where the dialog flow related to an answer associated with the confidence score value being below the confidence threshold value. Then, based on determining the second virtual assistant having a second confidence score value that is higher than the confidence score value, the computer transfers a knowledge base data of a topic associated with the dialog flow from the first virtual assistant to the second virtual assistant.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to data amalgamation management between multiple digital personal assistants. The following described exemplary embodiments provide a system, method, and program product to, among other things, assign a user specific digital personal assistant based on the determined personal traits, monitor the confidence score level of answers that were generated by the digital personal assistant and, based on determining low confidence score value, determining another digital personal assistant that has a higher confidence score value associated with the answer to the question and then, transferring the corresponding knowledge data to the current digital personal assistant. Therefore, the present embodiment has the capacity to improve the technical field of cross learning between multiple digital personal assistants by transferring only knowledge base data related to the asked question.

As previously described, digital personal assistant that may also be referred to as a virtual assistant (VA), a chatbot, or a personal assistant (PA) is a software agent that may or may not be coupled with a specific hardware that is configured to perform tasks or services for a user based on commands or questions in natural language. Typically, VA is able to interpret human speech and respond either by text or via synthesized voice. The VA enables users to have a conversation that not only limited to asking questions, but also can result in controlling automation devices and playing media content and allows to manage other basic tasks such as email, to-do lists, and calendar entries.

VAs typically integrate more than one module such as Natural Language Processing (NLP), Machine Learning (ML) and Artificial Intelligence (AI) modules. These modules require a large knowledge base for referencing and training purposes that uses large chunks of storage, especially for storing components required for ML and AI components of the virtual assistant. The ML and AI modules are typically designed and trained for providing correct solutions for a specific role, trait or field of interest in order to save storage and processing resources and provide faster and meaningful answers. As such, it may be advantageous to, among other things, implement a system that is capable of efficient data amalgamation management between multiple virtual assistants in order to transfer specific information relevant to the user between knowledge bases of various virtual assistants, in order to save space and provide meaningful assistance to the user.

According to one embodiment, a VA is assigned to a user based on determination of traits. The interaction between the user and the assigned VA is monitored and whenever the confidence score of the answer is lower than a threshold value the same question and associated conversation is transferred to multiple VAs to determine the highest confidence score value associated with the answer to the question. Then, if the highest confidence score is above a threshold value, the corresponding to the question knowledge base part is transferred or linked to the assigned VA in order to incorporate the data into the knowledge base of the assigned VA and/or for training of the various components of the VA in order to provide better responses with the higher associated confidence scores.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for data amalgamation management process that transfers knowledge base data related to a question that the current virtual assistant has insufficient training toward or associated information in order to provide a meaningful answer.

Figure 1:
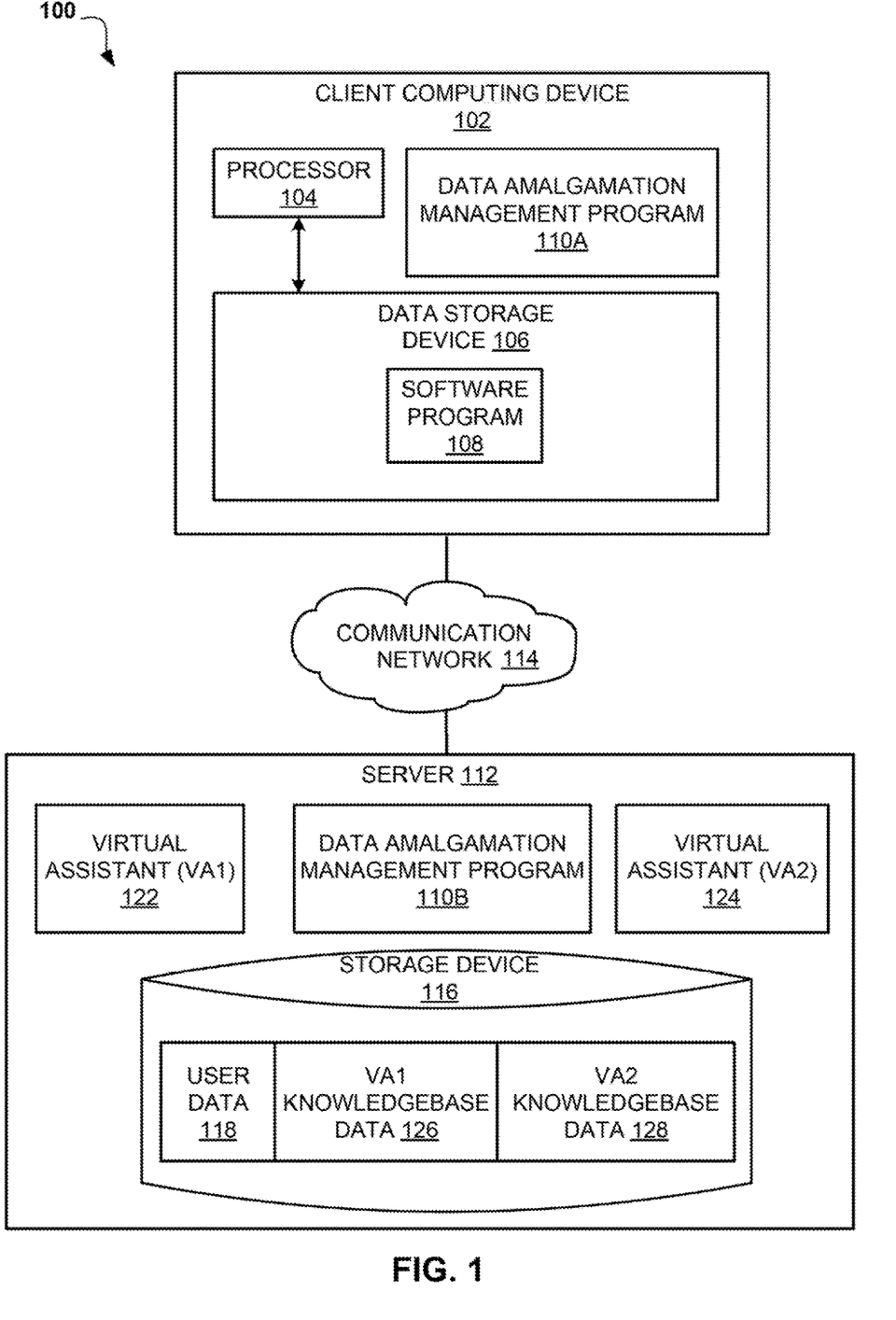
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and data amalgamation management program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running one or more virtual assistants such as VA1 122, VA2 124 and a data amalgamation management program 110B and having a storage device 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

The storage device 116 may be configured to store user data 118, VA1 knowledge base data 126 and VA2 knowledge base data 128. The user data 118 may be any data collected by the organization or data amalgamation management program 110A, 110B in order to determine traits of the user and thus determines what virtual assistant best fits the user needs. For example, user data 118 may have a record of each user and his/her role in the organization, where the role is matched to a specific virtual assistant. The VA1 knowledge base data 126 may be a database that stores all the information required for VA1 122 in order to provide answers to the user. For example, VA1 knowledge base data 126 may include unorganized data arranged by subject that is used to train the AI or ML components of VA1 122. The VA2 knowledge base data 128 may be a database similar to the VA1 knowledge base data 126 but required for the corresponding virtual assistant VA2 124.

According to the present embodiment, the data amalgamation management program 110A, 110B may be a program capable of determining when the knowledge base of the virtual assistance need to be expanded and expanding the knowledge base of the VA efficiently in order to save storage space. The data amalgamation management method is explained in further detail below with respect to FIG. 2.

Figure 2:
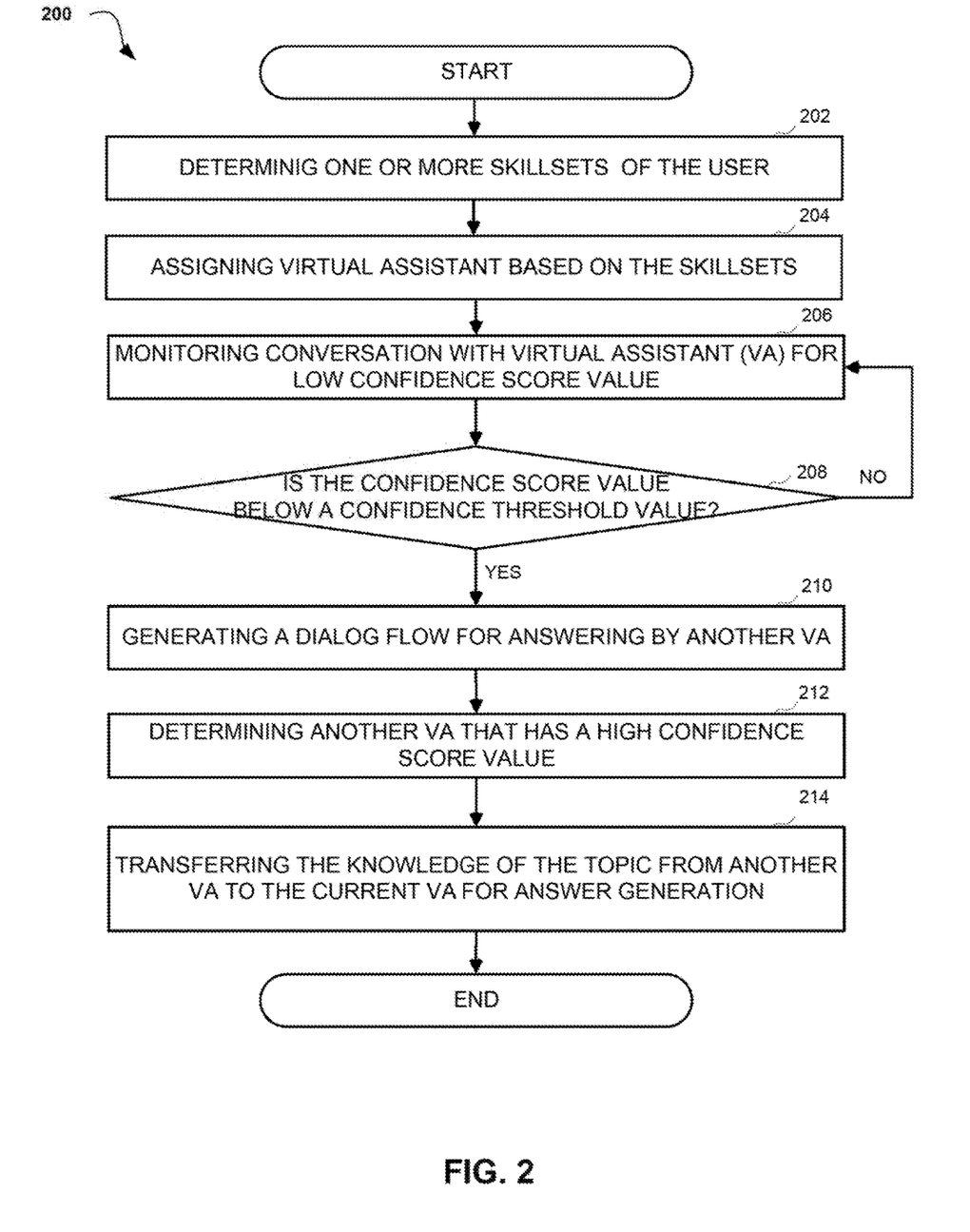
FIG. 2 is an operational flowchart illustrating data amalgamation management process according to at least one embodiment.

Referring now to FIG. 2, an operational flowchart illustrating data amalgamation management process 200 is depicted according to at least one embodiment. At 202, the data amalgamation management program 110A, 110B determines one or more skillsets of the user. According to an example embodiment, data amalgamation management program 110A, 110B may search user records in the organization where the user employed, such as from the user data 118, in order to determine one or more skillsets associated with the user traits. In one of the embodiments, if the user data 118 is a user directory of a specific organization, the amalgamation management program 110A, 110B may determine the skillset and/or personal traits of the user by finding the role associated with the user name or another identification of the user. For example, if Ann has an assigned role of "creating a benchmark for evaluating monitoring app on multiple public clouds platforms" in a user directory, the data amalgamation management program 110A, 110B may extract a skillset associated with "public cloud, benchmark" using an NLP module. In another embodiment, the data amalgamation management program 110A, 110B may determine one or more user skillsets by analyzing social profiles of the user.

Next, at 204, data amalgamation management program 110A, 110B assigns virtual assistant based on the skillsets. According to an example embodiment, the data amalgamation management program 110A, 110B may match the one or more skillsets to already available virtual assistants that were registered with the data amalgamation services. For example, all the available virtual assistants may have a database where all the associated skillsets with each of the corresponding virtual assistants are recorded. Thus, the data amalgamation management program 110A, 110B may query the "public cloud, benchmark" skillsets against the database and determine the corresponding virtual assistant. In another embodiment, the data amalgamation management program 110A, 110B may assign as current the virtual assistant that corresponds to the role of the employee. For example, if the employee has a role of an attorney recorded in the corporate directory, the virtual assistant designed to assist attorneys will be assigned to the user. In another embodiment, the data amalgamation management program 110A, 110B may assign a virtual assistant of the retired employee to a new employee that was hired for the same role.

Then at, 206, data amalgamation management program 110A, 110B monitors conversation with virtual assistants for low confidence score value. According to an example embodiment, the data amalgamation management program 110A, 110B monitors all the confidence score values that are coupled with all the answers generated by the available registered virtual assistants. Confidence score values are, typically, a type of estimate computed from the statistics of the observed data to predict the accuracy of the answers generated by each of the virtual assistants. According to an example embodiment, the data amalgamation management program 110A, 110B compares all the generated confidence score values with a confidence threshold value that is determined either by a user or may be determined automatically based on average and statistical deviations of all the answers provided by the virtual assistant.

Then, at 208, the data amalgamation management program 110A, 110B determines whether the confidence score value is below a confidence threshold value. According to an example embodiment, data amalgamation management program 110A, 110B may monitor confidence score values of each of the virtual assistants during runtime in order to determine when the assistant needs to increase its knowledge. According to one implementation, the method may continue along the operational flowchart 200, if data amalgamation management program 110A, 110B determines that the confidence score value is below confidence threshold value. If the data amalgamation management program 110A, 110B determines that the confidence score value is below a confidence threshold value (step 208, "YES" branch), the data amalgamation management program 110A, 110B may continue to step 210 to generates a dialog flow for another VA based on the determined skillsets. If the data amalgamation management program 110A, 110B determines that the confidence score value is not below a confidence threshold value (step 208, "NO" branch), the data amalgamation management program 110A, 110B may continue to step 206 and continue the interaction with virtual assistants for low confidence score values.

Next, at 210, the data amalgamation management program 110A, 110B generates a dialog flow for another VA based on the determined skillsets. According to an example embodiment, the data amalgamation management program 110A, 110B may extract the associated data with the question that received an answer with low confidence value in order to check the confidence values of other available virtual assistants. The other virtual assistants that may be queried are determined based on matching the skillsets of the user to available virtual assistants. In another embodiment, the data amalgamation management program 110A, 110B may send the dialog flow to all the available virtual assistants and determine the answer with the highest confidence value.

Then, at 212, the data amalgamation management program 110A, 110B determines another VA that has a high confidence score value based on the generated dialog flow. According to an example embodiment, data amalgamation management program 110A, 110B may determine that another VA is preferred if the confidence score value is above a threshold confidence value determined by the user, using a graphical user interface. For example, a typical confidence level of an AI system is 95%, thus a user may set a lesser value such as 94% the threshold confidence value In another embodiment, the threshold confidence value may be determined automatically based on another virtual assistant chosen as a reference, by using the average confidence score value generated by another virtual assistant that was chosen as a reference.

Next, at 214, the data amalgamation management program 110A, 110B transfers the knowledge of the topic from another VA to the current VA for answer generation. According to an example embodiment, data amalgamation management program 110A, 110B determines the topic of the question and uses the topic to transfer all data related to the topic from another VA to the current VA. For example, Ann asks her virtual assistant for public cloud registration process. Ann's virtual assistant, such as VA1 122, may not familiar with the subject. However, another virtual assistant, such as VA2 124, may have an appropriate confidence score value and thus relevant segment of the knowledge base from the VA2 knowledge base data 128 is linked or transferred to VA1 knowledge base data 126 for training of VA1 122 and answer generation. For example, a topic may be derived from the dialog flow and all the knowledge base data relevant to the topic is transferred or linked to the current virtual assistant.

Although not depicted in FIG. 2, the data amalgamation management program 110A, 110B may cause the current virtual assistant modules to train based on the new knowledge base data and answer the question after the training is finalized.

It may be appreciated that FIG. 2 provides only an illustration of one implementation and does not imply any limitations with regard to how different embodiments may be implemented. Many modifications to the depicted environments may be made based on design and implementation requirements. In an alternate embodiment, a user may be a new virtual assistant that needs to be intelligently trained, thus the new virtual assistant may query different virtual assistants and receive only knowledge relevant to the queries from other virtual assistants in order to train its AI and ML modules. For example, in case a new virtual assistant needs to be an amalgamation between two or more virtual assistants, the skillsets of the new virtual assistant may be set to include the knowledge of interest for the new assistant and a set of questions may be prepared in order to train the new virtual assistant.

Figure 3:
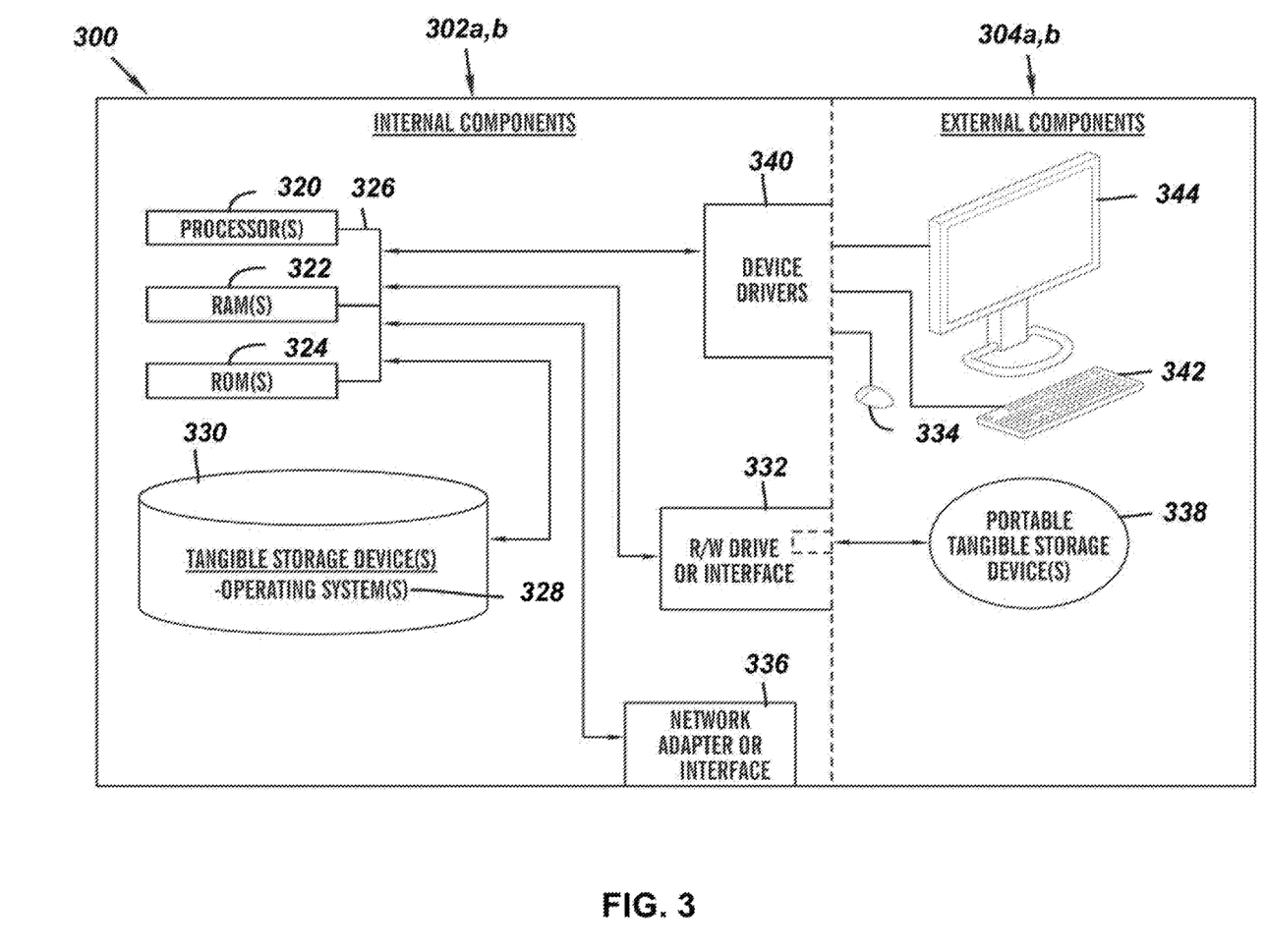
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 *a,b* and external components 304 *a,b* illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the data amalgamation management program 110A in the client computing device 102, and the data amalgamation management program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the cognitive screen protection program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The software program 108 and the data amalgamation management program 110A in the client computing device 102 and the data amalgamation management program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the data amalgamation management program 110A in the client computing device 102 and the data amalgamation management program 110B in the server 112 are loaded into the respective hard drive 330. The network may comprise copper wires, optical fibers, wireless transmission, routers, firewalls, switches, gateway computers and/or edge servers.

Each of the sets of external components 304 a, b can include a computer display monitor 344, a keyboard 342, and a computer mouse 334. External components 304 a, b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
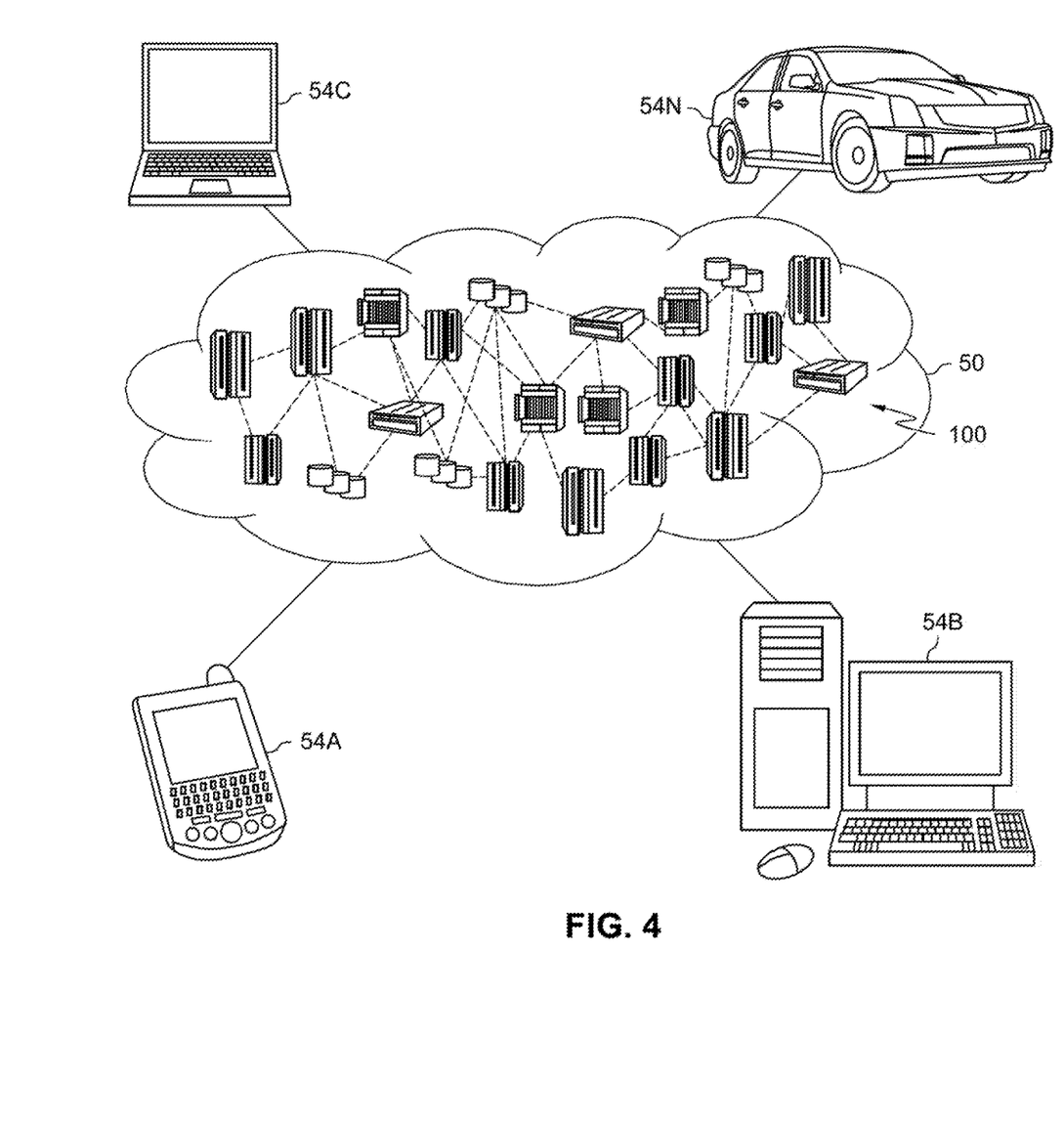
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
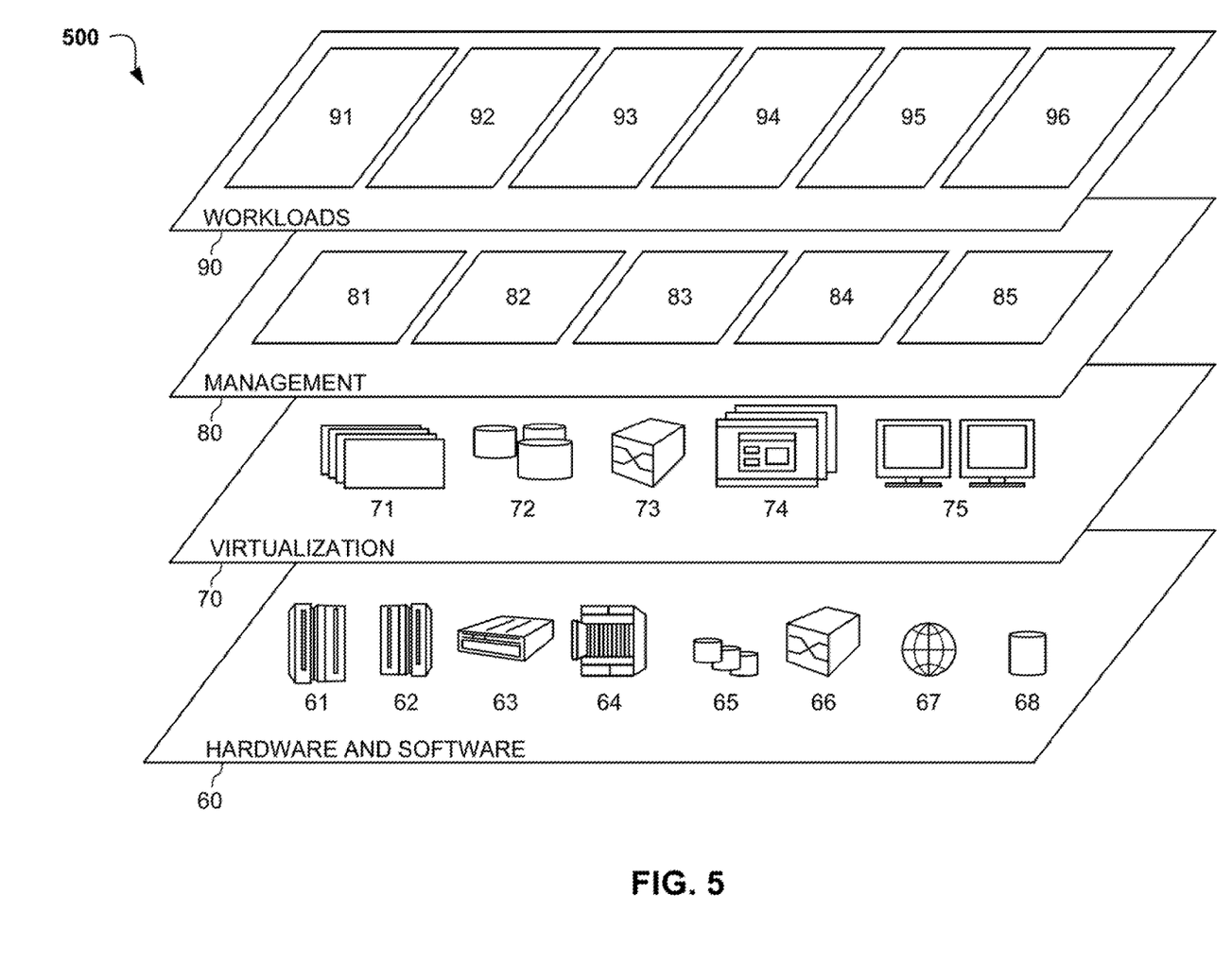
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data amalgamation management 96. Data amalgamation management 96 may relate to monitoring conversations between one or more virtual assistants and one or more users and based on determining a low confidence score value transferring or linking a part of the knowledge base of another virtual assistant that has a higher confidence score value associated with the answer to the question.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for data amalgamation management, the method comprising:
    monitoring conversation between a user and a first virtual assistant from a plurality of virtual assistants for a confidence score value being below a confidence threshold value, wherein the confidence score value is associated with each answer of the first virtual assistant;
    generating a dialog flow for answering by a second virtual assistant, wherein the dialog flow is related to a first answer, the confidence score value of the first answer being below the confidence threshold value; and
    in response to the second virtual assistant generating a second answer corresponding to a second confidence score value that is above the confidence threshold value, transferring knowledge base data of a topic associated with the dialog flow from the second virtual assistant to the first virtual assistant.

2. The method of claim 1, wherein the first virtual assistant is determined from the plurality of virtual assistants based on one or more skillsets of the user.

3. The method of claim 2, wherein the one or more skillsets are determined by analyzing a user role, wherein the user role is determined from a user directory.

4. The method of claim 2, wherein determining the second virtual assistant is based on the one or more skillsets of the user.

5. The method of claim 1, wherein the first virtual assistant is determined from the plurality of virtual assistants based on an associated confidence score value generated by each of the plurality of virtual assistants.

6. The method of claim 1, wherein the confidence threshold value is determined based on another virtual assistant chosen as a reference.

7. The method of claim 1, wherein the user is a third virtual assistant.

8. A computer system for data amalgamation management, the computer system comprising:
one or more processors, one or more computer-readable memories, one or more computer-readable storage medium, and program instructions stored on at least one of the one or more storage medium for execution by at least one of the one or more processors via at least one of the one or more memories, wherein the computer system is capable of performing a method comprising:
monitoring conversation between a user and a first virtual assistant from a plurality of virtual assistants, for a confidence score value being below a confidence threshold value, wherein the confidence score value is associated with each answer of the first virtual assistant;
generating a dialog flow for answering by a second virtual assistant, wherein the dialog flow is related to a first answer, the confidence score value of the first answer_being below the confidence threshold value; and
in response to the second virtual assistant generating a second answer corresponding to a second confidence score value that is above the confidence threshold value, transferring knowledge base data of a topic associated with the dialog flow from the second virtual assistant to the first virtual assistant.

9. The computer system of claim 8, wherein the first virtual assistant is determined from the plurality of virtual assistants based on one or more skillsets of the user.

10. The computer system of claim 9, wherein the one or more skillsets are determined by analyzing a user role, wherein the user role is determined from a user directory.

11. The computer system of claim 9, wherein determining the second virtual assistant is based on the one or more skillsets of the user.

12. The computer system of claim 8, wherein the first virtual assistant is determined from the plurality of virtual assistants based on an associated confidence score value generated by each of the plurality of virtual assistants.

13. The computer system of claim 8, wherein the confidence threshold value is determined based on another virtual assistant chosen as a reference.

14. The computer system of claim 8, wherein the user is a third virtual assistant.

15. A computer program product for data amalgamation management, the computer program product comprising:
one or more computer-readable storage medium and program instructions stored on at least one of the one or more storage medium, the program instructions executable by a processor capable of performing a method, the method comprising:
monitoring conversation between a user and a first virtual assistant from a plurality of virtual assistants, for a confidence score value being below a confidence threshold value, wherein the confidence score value is associated with each answer of the first virtual assistant;
generating_a dialog flow for answering by a second virtual assistant, wherein the dialog flow is related to a first answer, the confidence score value of the first answer being below the confidence threshold value; and
in response to the second virtual assistant generating a second answer corresponding to a second confidence score value that is above the confidence threshold value, transferring knowledge base data of a topic associated with the dialog flow from the second virtual assistant to the first virtual assistant.

16. The computer program product of claim 15, wherein the first virtual assistant is determined from the plurality of virtual assistants based on one or more skillsets of the user.

17. The computer program product of claim 16, wherein the one or more skillsets are determined by program instructions to analyze a user role, wherein the user role is determined from a user directory.

18. The computer program product of claim 16, wherein program instructions to determine the second virtual assistant is based on the one or more skillsets of the user.

19. The computer program product of claim 15, wherein the first virtual assistant is determined from the plurality of virtual assistants based on an associated confidence score value generated by each of the plurality of virtual assistants.

20. The computer program product of claim 15, wherein the user is a third virtual assistant.

* * * * *